(12) United States Patent
Kulkarni et al.

(10) Patent No.: US 12,318,844 B2
(45) Date of Patent: Jun. 3, 2025

(54) CONTINUOUS FLOW PROCESS FOR THE SYNTHESIS OF METAL NANOWIRES USING BUBBLE COLUMN REACTOR

(71) Applicant: COUNCIL OF SCIENTIFIC AND INDUSTRIAL RESEARCH, New Delhi (IN)

(72) Inventors: Amol Arvind Kulkarni, Maharashtra (IN); Prachi Kate, Maharashtra (IN); Suneha Patil, Maharashtra (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 448 days.

(21) Appl. No.: 17/756,037

(22) PCT Filed: Nov. 12, 2020

(86) PCT No.: PCT/IN2020/050953
§ 371 (c)(1),
(2) Date: May 13, 2022

(87) PCT Pub. No.: WO2021/095054
PCT Pub. Date: May 20, 2021

(65) Prior Publication Data
US 2022/0388062 A1 Dec. 8, 2022

(30) Foreign Application Priority Data

Nov. 15, 2019 (IN) .............................. 201911046584

(51) Int. Cl.
*B22F 9/24* (2006.01)
*B01J 4/00* (2006.01)
(Continued)

(52) U.S. Cl.
CPC ................. *B22F 9/24* (2013.01); *B01J 4/004* (2013.01); *B01J 10/002* (2013.01);
(Continued)

(58) Field of Classification Search
CPC ....................................................... B22F 9/24
See application file for complete search history.

(56) References Cited

U.S. PATENT DOCUMENTS 11,684,901 B2 * 6/2023 Meshkat Mamalek .. B01J 19/22
75/371
2014/0102254 A1 4/2014 Jiang et al.

FOREIGN PATENT DOCUMENTS

| CN | 109604630 | 4/2019 |
| JP | S47-030510 | 8/1972 |

(Continued)

OTHER PUBLICATIONS

Abbas et al., Preparation of silver nanowires and their application in conducting polymer nanocomposites, Materials Chemistry and Physics, vol. 166, Sep. 15, 2015, pp. 1-15.*
Hyung Duk Yun, et al., ffective Synthesis and Recovery of Silver Nanowires Prepared by Tapered Continuous Flow Reactor for Flexible and Transparent Conducting Electrode, Metals 2016, 6(1), 14; https://doi.org/10.3390/met6010014.*
(Continued)

*Primary Examiner* — Christopher S Kessler
(74) *Attorney, Agent, or Firm* — Knobbe, Martens, Olson & Bear, LLP

(57) ABSTRACT

A continuous flow process for the synthesis of metal nanowires using a bubble column reactor. Also disclosed are different types of multiphase bubble column reactors for synthesizing metal nanowires in high yields and purity through a continuous process. The continuous process provides tunability for the aspect ratio of the nanowires.

10 Claims, 7 Drawing Sheets

(51) Int. Cl.
    *B01J 10/00*     (2006.01)
    *B01J 19/18*     (2006.01)

(52) U.S. Cl.
    CPC ...... *B01J 19/1862* (2013.01); *B01J 2204/002* (2013.01); *B22F 2301/255* (2013.01)

(56) References Cited

FOREIGN PATENT DOCUMENTS

| | | |
|---|---|---|
| JP | 2013-007082 A | 1/2013 |
| JP | 2013-503260 A | 1/2013 |
| WO | WO 2014/169487 A1 | 10/2014 |
| WO | WO 2017/210026 A1 | 12/2017 |
| WO | WO 2019/049172 A1 | 3/2019 |

OTHER PUBLICATIONS

Extended European Search Report in Application No., EP 20887783.7, dated Apr. 13, 2023.
Indian Examination Report in Application No., 201911046584, dated Dec. 20, 2022.
International Search Report in PCT/IN2020/050953, issued Feb. 17, 2021.
Besagni, Giorgio, et al., "Two-Phase Bubble cols. A Comprehensive Review," ChemEngineering (2018), 2, 13 80 pages.
Gottesman, Ronen, et al., "Silver nanowires and nanoparticles from a millifluidic reactor: Application to metal assisted silicon etching," New J. Chem., 2012, 36, 2456-2459.
Abdulrazzaq, Dr. Burhan Sadeq, "A Hydrodynamic Study in a Sieve Plate Sectionalized Bubble Column," Eng. & Tech. Journal, vol. 29, No. 6, 2011, pp. 1145-1146.

\* cited by examiner

CONTINUOUS FLOW PROCESS FOR THE SYNTHESIS OF METAL NANOWIRES USING BUBBLE COLUMN REACTOR

FIELD OF THE INVENTION

The present invention relates to a continuous flow process for the synthesis of metal nanowires using bubble column reactor. The present invention further relates to different types of multiphase bubble column reactors for synthesizing metal nanowires in high yields through a continuous process.

BACKGROUND OF THE INVENTION AND DESCRIPTION OF PRIOR ART

Metal nanowires, particularly silver nanowires are finding applications in a variety of industries, with the need of the electronic industry for this specialty chemical being quite substantial. While, manufacturing processes for metal nanowires is the subject matter of interest for several researchers worldwide, a large-scale manufacturing process with high yields still eludes the scientific community.

Several processes for large scale manufacturing of silver nanowires have been proposed, but they suffer from several drawbacks. The design of some equipment such as continuous stirred tank reactors generates a lot of waste and poor yields of the nanowires, making the large-scale manufacturing by this process an economically non-viable choice. Conventional processes provide poor yields, are time consuming and being batch processes show batch to batch variation. But the major drawback of the prior art processes is that they do not yield nanowires with 100% shape selectivity. The product is either metal nano particles or a mix of nano particles and nano wires. Also, the silver nano wires obtained by prior art processes have poor aspect ratio or a wide range of aspect ratio.

Methods for manufacturing silver nanowire are broadly divided into template-assisted and template-free methods. For template-assisted methods, a template that will induce silver to grow into nanowires is used e.g. carbon nanotube, porous AAO (Anodic Alumina Oxide), porous $TiO_2$ etc. For template-free methods, silver nanowires are produced by reducing silver salt at a temperature of 110-200° C.; morphology of which can be tailored by tuning the surfactant concentration, precursor concentration, alkali halides concentration or adding different reducing agents. Template-assisted method always leads to impure product, since it is hard to recover silver from its templates. In addition, the template itself has drawbacks such as fragile nature, difficult to produce and are small in size. On the other hand, template-free method is the most widely used method for synthesis of silver nanowires in laboratory. Nevertheless, disadvantages of this wet-chemistry method are still evident, due to its low manufacturing efficiency and hours to days of time is needed, for few milligrams of product output. Recently, a microwave-assisted Solution method has been used for rapid synthesis of silver nanowire, however, the productivity is still at a low level, which yields blend of nanoparticle and wires.

Article published, "A Hydrodynamic Study in a Sieve Plate Sectionalized Bubble Column" by Dr. Burhan SadeqAbdulrazzaq published in Eng. & Tech. Journal, Vol. 29, No. 6, 2011 reports an experimental semi-batch tray bubble column setup. Column 0.15 m inside diameter and total height of 2.20 m is sectionalized into four stages using three perforated plates to investigate the effect of tray geometry, superficial gas velocities and liquid phase physical properties on overall gas holdup. The overall gas holdup is measured experimentally by bed expansion technique.

Article published, "Two-Phase Bubble Columns: A Comprehensive Review" by Giorgio Besagni et al. published in ChemEngineering 2018, 2, 13 reports analysis of the flow regimes, the flow regime transitions, the local and global fluid dynamics parameters, and the mass transfer phenomena. Article has also discussed how the operating parameters (i.e., pressure, temperature, and gas and liquid flow rates), the operating modes (i.e., the co-current, the counter-current and the batch modes), the liquid and gas phase properties, and the design parameters (i.e., gas sparger design, column diameter and aspect ratio) influence the flow regime transitions and the fluid dynamics parameters. Secondly, the article presents the experimental techniques for studying the global and local fluid dynamic properties. Finally, the article presents the modeling approaches to study the global and local bubble column fluid dynamics.

Article titled, "Silver nanowires and nanoparticles from a mill fluidic reactor: application to metal assisted silicon etching" by Ronen Gottesman et al. published in New J. Chem., 2012, 36, 2456-2459 reports Silver nanowires and nanoparticles are synthesized by a polyol method in a mill fluidic reactor. By changing reaction parameters, the article has demonstrated the synthesis of single crystalline silver nanoparticles in a rapid reaction time of only 3 minutes. All results are compared with standard batch and microwave reactions. An example of application is provided through the silver nanowire assisted etching of silicon wafers. This colloidal approach of metal assisted silicon etching allows transferring of the nanowire shape to silicon.

The current method for synthesis of silver nanowires is mainly Polyol method. In polyol method silver nitrate is reduced by polyol (ethylene glycol), with the protection of Polyvinylpyrrolidone and the supplementary effect of alkali halides. This method achieves the controllable growth of nanowires by precisely controlling the reactant concentrations. However, formation of crystal seeds and longitudinal growth of nanowires happen simultaneously and interfere with each other. In the crystal seed formation phase, existence of longitudinal growth may increase the non-uniformity of the diameter; and in the phase of longitudinal growth, generation of new isotropic seeds by self-nucleation may gravely block the production of nanowires and also consume the silver sources, which should be used for longitudinal growth, leading to the decrease of the length of silver nanowires.

Thus, there remains a great need in the art to provide a process that results in large yields of metal nanowires with high aspect ratios, high purity, in minimal time and in a reproducible fashion.

OBJECTIVES OF THE INVENTION

The main objective of the present invention is therefore to provide a continuous flow process for the synthesis of metal nanowires which obviates the drawbacks of the hitherto reported prior art.

Another objective of the present invention is to provide a continuous flow process preferably for the synthesis of silver nanowire by using a bubble column reactor.

Still another objective of the present invention is to provide a bubble column reactor for the synthesis of metal nanowires preferably silver nanowire.

SUMMARY OF THE INVENTION

Accordingly, the present invention provides a bubble column reactor and a continuous flow process for the synthesis of metal nanowire preferably silver nanowire by using a bubble column reactor.

In an embodiment, the present invention provides a continuous flow process for the synthesis of metal nanowire preferably silver nanowire by using at least one bubble column reactor comprising the steps of:
 a) dissolving a metal salt into ethylene glycol to form a solution A of metal salt;
 b) preheating ethylene glycol and dissolving poly (vinyl pyrrolidone) (PVP40,000-360,000) to make a solution B of poly (vinyl pyrrolidone);
 c) continuously feeding the blend of the solution A of metal salt, the solution B of poly (vinyl pyrrolidone) (MW~40,000-360,000), $FeCl_3$ in ethylene glycol solution to the bubble column reactor from the bottom inlet;
 d) maintaining the temperature in each reactor at 130-190° C., with a cumulative residence time of 25-80 min; and
 e) allowing the growth of nanowires of the metal to the desired dimensions;
  wherein the aspect ratio of said nanowire is tunable in the range of 300 to 1200 with 100% purity, and the conversion of metal salt is in the range of 85% to 95%.

In another embodiment, the present invention provides a bubble column reactor comprising: a column alone or in series with at least one more column or a continuously stirred reactor, optionally comprising at least one external or one internal air loop or said column comprising one or at least two sections, the diameter of each section being same, the sections connected by a narrower section, wherein the ratio of diameter of narrow section:diameter of section is in the range 0.2 to 0.5 and the ratio of the length of section:diameter of section is always 1; a sintered plate sparger or a ring sparger wherein the diameter of the sparger is equal to or greater than the diameter of the narrow section, with a superficial air velocity of 0.01-0.06 m/s and at least two air jets of 1 mm diameter and a velocity >1 meter/second.

In still another embodiment, the present invention further provides one or more multiphase unstirred reactors wherein said reactor further comprises a simple bubble column reactor or a sectionalized bubble column reactor with perforated plates or sectionalized bubble column with many compartments having no perforated plates or an internal air-lift loop reactor or external air-lift loop reactor with draft tube having diameter of 0.1-0.4 times the column diameter and the ratio of the reactor height to diameter in the range 6-20 and a sparger (ring sparger or sintered sparger) with at least one air jet of 1 mm diameter and an jet air velocity >1 meter/second, wherein the diameter of the sparger is equal to the diameter of the column.

In another embodiment, the process of the present invention optionally employs 2-10 bubble column reactors.

In still another embodiment, the present invention provides a process, wherein it employs at least two bubble column reactors.

In yet another embodiment, the present invention provides a process, wherein the bubble column reactors are connected in series.

In still another embodiment, the present invention provides a process, wherein 2-10 bubble column reactors are connected in series.

In yet another embodiment, the present invention provides a process, wherein the metal salt is silver nitrate.

In still another embodiment, the present invention provides a process, wherein solution A is 0.25 to 0.65 M solution of silver nitrate in ethylene glycol.

In yet another embodiment, the present invention provides a process, wherein solution B is 0.077 M solution of poly vinyl pyrrolidone in ethylene glycol.

ABBREVIATION USED

FESEM: Field Emission Scanning Electron Microscope

PVP: poly (vinyl pyrrolidone)

$FeCl_3$: Iron(III) chloride

CSTR: continuous stirred-tank reactor $AgNO_3$: Silver nitrate

AAS: Atomic Absorption Spectrophotometer

BRIEF DESCRIPTION OF THE ACCOMPANYING DRAWINGS

FIG. 1A: Bubble column reactor (1—reactor inlet where the reactants are introduced into the column, 2—the inlet provided for gas/air, 3—sparger, 4—outlet for reactant mixture and 5—outlet for air)

FIG. 1B: Bubble column with ring sparger. (1—reactor inlet where the reactants are introduced into the column, 2—the inlet provided for gas/air, 3—sparger, 4—outlet for reactant mixture and 5—outlet for air)

FIG. 1C: Sectionalized bubble column reactor with perforated sections. (1—reactor inlet where the reactants are introduced into the column, 2—the inlet provided for gas/air, 3—sparger, 4—outlet for reactant mixture and 5—outlet for air)

FIG. 1D: Modified sectionalized bubble column reactor. (1—reactor inlet where the reactants are introduced into the column, 2—the inlet provided for gas/air, 3—sparger, 4—outlet for reactant mixture and 5—outlet for air)

FIG. 1E: External loop air lift reactor. (1—reactor inlet where the reactants are introduced into the column, 2—the inlet provided for gas/air, 3—sparger, 4—outlet for reactant mixture and 5—outlet for air)

FIG. 1F: Internal loop air lift reactor. (1—reactor inlet where the reactants are introduced into the column, 2—the inlet provided for gas/air, 3—sparger, 4—outlet for reactant mixture and 5—outlet for air)

FIG. 2: FESEM images of Silver Nanowires produced using 2 CSTRs followed by bubble column reactor set up.

FIG. 3: FESEM images of Silver Nanowires produced using 2 CSTRs followed by bubble column with attached condenser set up.

FIG. 4: FESEM images of Silver Nanowires produced using 2 CSTRs followed by bubble column with sectional plates.

FIG. 5: FESEM images of Silver Nanowires produced in single bubble column.

FIG. 6: FESEM images of Silver Nanowires produced in single bubble column with converging-diverging sections.

FIG. 7: FESEM images of Silver Nanowires produced in a single bubble column with modified sparger and air compressor was used for gas sparging.

FIG. 8: FESEM images of Silver Nanowires produced using two bubble columns in series set up.

FIG. 9: FESEM images of Silver Nanowires produced using two bubble columns in series set up.

FIG. 10: FESEM images of Silver Nanowires produced using two bubble columns in series set up (simple bubble column followed by air lift bubble column).

DETAILED DESCRIPTION OF THE INVENTION

The invention will now be described in detail in connection with certain preferred and optional embodiments, so that various aspects thereof may be more fully understood and appreciated.

In an aspect, the present invention provides a continuous flow process for the synthesis of metal nanowires by using a bubble column reactor comprising the steps of:
a) dissolving a metal salt into ethylene glycol to obtain a solution A;
b) preheating ethylene glycol and dissolving poly (vinyl pyrrolidone) (PVP 40,000-360,000) to obtain a solution B;
c) continuously feeding the blend of the solution A of metal salt, the solution B of poly (vinyl pyrrolidone) (MW~40,000-360,000), $FeCl_3$ in ethylene glycol solution to the bubble column reactor from the bottom inlet;
d) maintaining the temperature in each reactor at 130-190° C., with a cumulative residence time of 25-80 min; and
e) allowing the growth of nano wires of the metal to the desired dimensions.

In another aspect, the present invention provides a continuous flow process for the synthesis of metal nanowires by using a bubble column reactor comprising the steps of:
a) dissolving a metal salt into ethylene glycol to obtain 0.25 to 0.65 M solution of metal salt;
b) preheating ethylene glycol to 110° C. and dissolving poly (vinyl pyrrolidone) (PVP 360,000) to obtain a 0.077 M solution of poly (vinyl pyrrolidone);
c) continuously feeding the blend of 0.25 to 0.65 M metal salt, 0.077 M poly (vinyl pyrrolidone) (MW~40,000-360,000), 800 µM $FeCl_3$ in ethylene glycol solution to the first multiphase unstirred reactor from the bottom inlet;
d) maintaining the temperature in each reactor at 130-190° C., with a cumulative residence time of 25-80 min; and
e) allowing the growth of nanowires of the metal to the desired dimensions.

In the processes described above, the metal salt is preferably silver nitrate. The ethylene glycol acts as solvent as well as reducing agent, and PVP acts as stabilizer and capping agent to guide the growth of nanowires. Further, the process may either employ at least one bubble column reactor or at least two bubble column reactors for the synthesis of metal nanowires. In an aspect, the process employs 2-10 bubble column reactors and the bubble column reactors are connected in series. The multiphase unstirred reactor of step (c) can be a bubble column reactor or a sectionalized bubble column reactor or an air-loop reactor.

The above process can be carried out in bubble column reactor alone or with continuous stirred tank reactors. The process of the invention employs a multiphase unstirred continuously operated reactor where the draft tube diameter is 0 to 0.15 times the reactor diameter and the height of the reactor is between 7-10 times the reactor diameter. The draft tube is a concentric tube inside an airlift reactor that facilitates an increase circulation of the contents of the reactor.

In another aspect, the present invention provides a bubble column reactor comprising: a column alone or in series with at least one more column or a continuously stirred reactor, optionally comprising at least one external (4) or one internal air loop (2) or said column comprising one or at least two sections, the diameter of each section being same, the sections connected by a narrower section, wherein the ratio of diameter of narrow section:diameter of section is in the range 0.2 to 0.5 and the ratio of the length of section: diameter of section is always 1 to 2; a sintered plate sparger (3) or a ring sparger (3) wherein the diameter of the sparger (3) is equal to or greater than the diameter of the narrow section, with a superficial air velocity of 0.01-0.06 m/s and at least two air jets (1 and 5) of 1 mm diameter and a velocity >1 meter/second.

In still another aspect, the present invention further provides one or more multiphase unstirred reactors wherein said reactor further comprises a simple bubble column reactor or a sectionalized bubble column reactor with perforated plates or sectionalized bubble column with many compartments having no perforated plates or an internal air-lift loop reactor or external air-lift loop reactor with draft tube having diameter of 0.1-0.4 times the column diameter and the ratio of the reactor height to diameter in the range 6-20 and a sparger (3)(ring sparger or sintered sparger) with at least one air jet periodically operated at 0.5 mm to 2 mm diameter with a jet air velocity >1 meter/second, wherein the diameter of the sparger is equal to the diameter of the column.

In a further aspect, a bubble column reactor is used having aspect ratio more than 8 in batch or continuous mode. Air was sparged continuously through a bottom sparger with the superficial gas velocity of 0.01-0.06 m/s. Air sparged in the bubble column was given a vent through a reflux condenser to condense acid vapors in the reactor and release the non-condensable.

In another aspect, an air-loop lift reactor having aspect ratio between 7 to 10 is used in continuous operation mode, wherein the draft tube diameter is 0.1-0.12 times the column diameter.

In still another aspect, the invention claims using at least one air jet periodically operated at 0.5 mm to 2 mm diameter with a jet air velocity >1 m/s, to create random flow field in the sparger area.

In yet another aspect, the final product is continuously mixed with acetone at 5 to 6 times in volume, in the outlet tubing for separation of silver nanowires in a still vessel. The aspect ratio of nanowires synthesized this way is in the range of 300 to 1200 with 100% purity. The purity of the metal was determined by EDAX/elemental analysis and the results indicated the metal to be 100% pure.

In a further aspect, the process provides metal nanowires with 85% to 95% conversion of metal salt taken initially and yield of >85% of nanowires.

The reactors and process conditions employed for the process of synthesis of metal nanowires as described herein result in a deposition free process of synthesis, wherein the aspect ratio of the nanowires is tunable in the range of 300-1200.

The comparative examples 1-5 employed continuous stirred tank reactors or bubble column reactors with different process parameters and this resulted in silver nanowires that did not possess the desired aspect ratio between 300-1200. The change in process parameters also affected the conversion of the silver nitrate to pure silver nanowires as evidenced in examples 1-5. Thus the process claimed is not a mere optimization of process parameters, but an unanticipated combination of the construct and configuration of the bubble column reactor and process parameters leading to 100% pure silver nanowires, with the aspect ratio tunable in the range of 300-1200, with 85-95% conversion of silver nitrate and >85% yield of silver nanowires.

EXAMPLES

The following examples are given by way of illustration only and therefore should not be construed to limit the scope of the present invention in any manner.

Comparative Examples—Examples 1-5

Example 1

Upon using two continuous stirred tank reactors (CSTRs) 60 ml volume) followed by a bubble column reactor (FIG. 1A) (~1200 mL) with inlet composition of the reactants as 0.25 M $AgNO_3$, 600 µM $FeCl_3$ and 0.077 M PVP (mol. wt. 360,000), to first CSTR and with temperature in each reactor maintained at 140° C., with a cumulative residence time of one hour, the analysis of outlet samples using Atomic Absorption Spectrophotometer (AAS) showed 73.6% conversion. Mixing in the bubble column was achieved with the aid of air sparging from the bottom at a superficial velocity of 0.0051 m/s. The average diameter and length of the nanowires (observed using Field Emission Scanning Electron Microscope) were 465±100 nm and 23±10 µm, respectively giving a low aspect ratio in the range of 50-70, refer FIG. 2.

The second CSTR allow more time for the reactants to react and form nuclei before entering the growth phase.

Figure 3:
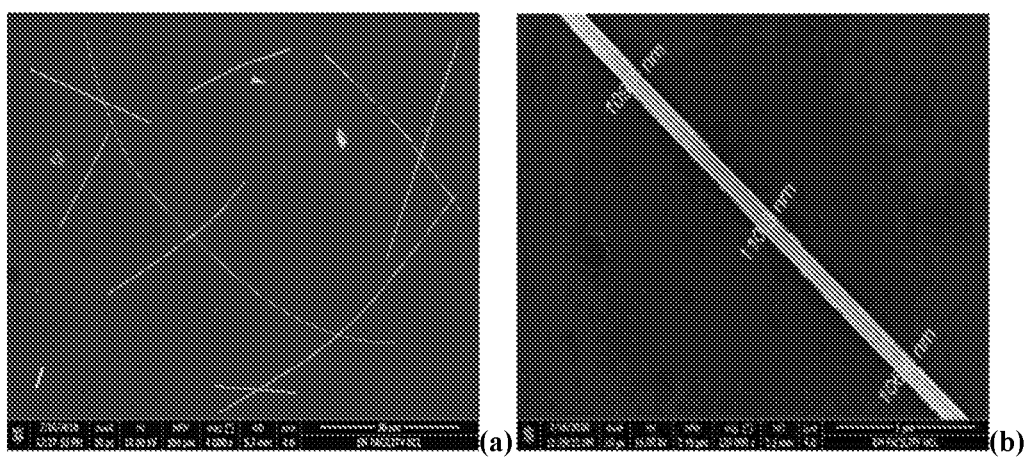
FIG. 3 represent FESEM images of Silver Nanowires produced using 2 CSTRs followed by bubble column with attached condenser set up.

Example No. 2: Experimental set-up, reaction conditions as well as the procedure was followed as in Example 1 with the only addition of a reflux condenser at the top of the bubble column (using the reactor in FIG. 1A). The atomic absorption spectroscopy results revealed around 12% improvement in the conversion (~85%), whilst a significant increase in the overall aspect ratio of nanowires in the range of 250-300 (average diameter 110±55 nm and length 26±15 µm) was observed, refer FIG. 3.

Figures 1A, 1B, 1C:
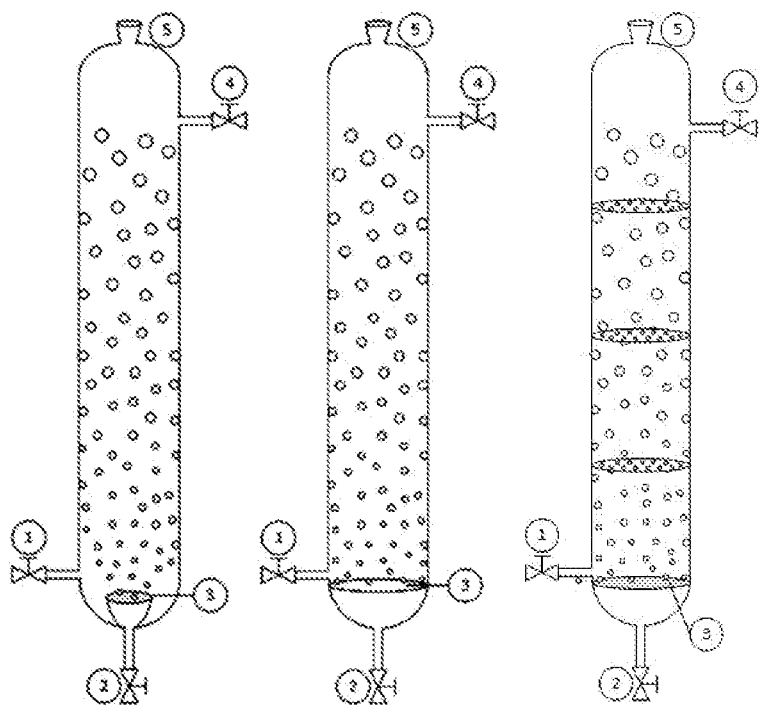
FIG. 1A represents Bubble column reactor, wherein 1—reactor inlet where the reactants are introduced into the column, 2—the inlet provided for gas/air, 3—sparger, 4—outlet for reactant mixture and 5—outlet for air.
FIG. 1B represent Bubble column with ring sparger, wherein 1—reactor inlet where the reactants are introduced into the column, 2—the inlet provided for gas/air, 3—sparger, 4—outlet for reactant mixture and 5—outlet for air.
FIG. 1C represent Sectionalized bubble column reactor with perforated sections, wherein 1—reactor inlet where the reactants are introduced into the column, 2—the inlet provided for gas/air, 3—sparger, 4—outlet for reactant mixture and 5—outlet for air.
Figure 2:
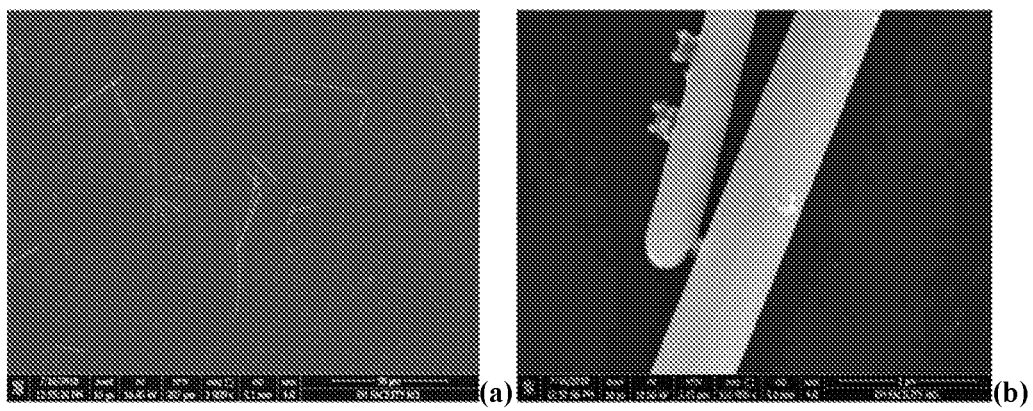
FIG. 2 represent FESEM images of Silver Nanowires produced using 2 CSTRs followed by bubble column reactor set up.
Figure 4:
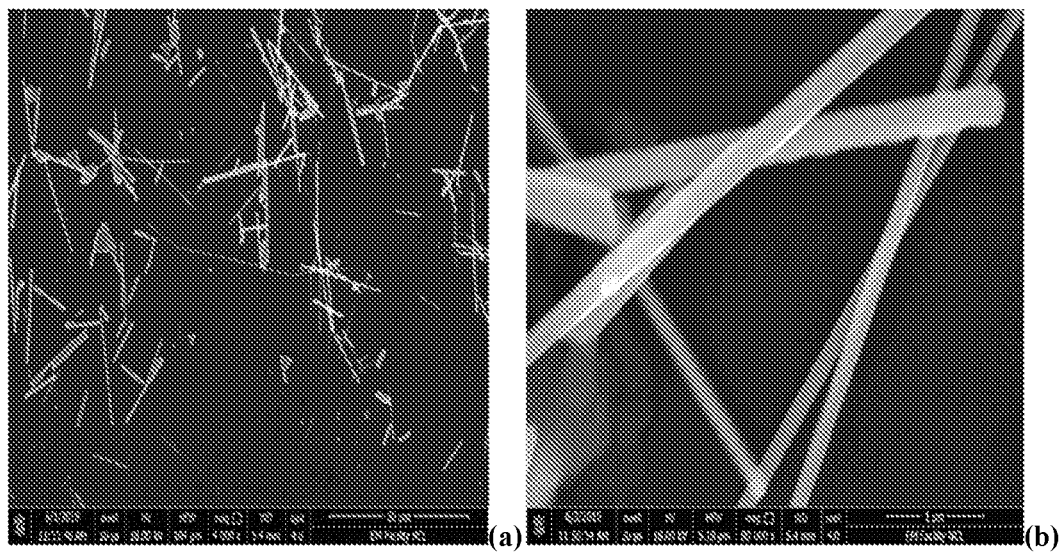
FIG. 4 represent FESEM images of Silver Nanowires produced using 2 CSTRs followed by bubble column with sectional plates.

Example No. 3: The reaction was carried out keeping all the reaction parameters same as above (Example 1) using a sectionalized bubble column having 3 perforated plates with hole diameter 1 mm (FIG. 1C). The overall conversion in this experiment was 64% and significant decrease in the overall aspect ratio (150-180) of nanowires (average diameter 150±75 nm and length 10±5 µm) was observed. A lot of silver nanowires were found deposited on the perforated plates, refer FIG. 4.

Figure 5:
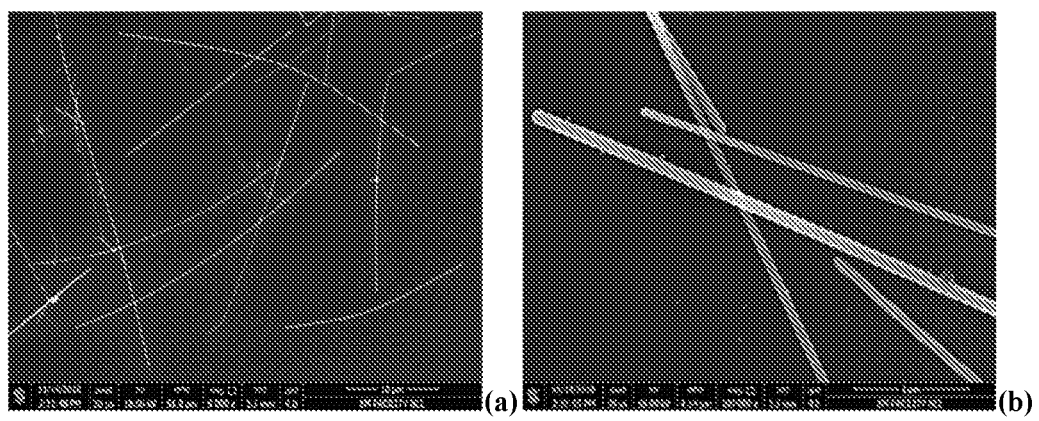
FIG. 5 represent FESEM images of Silver Nanowires produced in single bubble column.

Example No. 4: Modified design of bubble column using a bigger ring sparger (FIG. 1B), where the sparger diameter was kept same as the column diameter. Upon keeping all other parameters maintained as in Example 1, co-current flow of reactants and air (superficial velocity 0.0051 m/s) from the bottom of the column resulted in about 88.4% conversion of nanowires. The average diameter and length (analysed by FE-SEM and measured using ImageJ) was 65±10 nm and 33±15 µm respectively, refer FIG. 5.

Figure 1D:
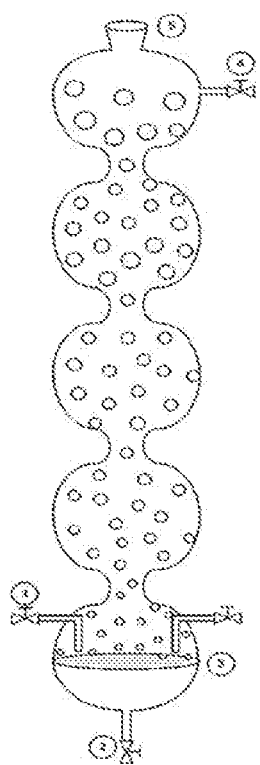
FIG. 1D represent Modified sectionalized bubble column reactor, wherein 1—reactor inlet where the reactants are introduced into the column, 2—the inlet provided for gas/air, 3—sparger, 4—outlet for reactant mixture and 5—outlet for air.
Figure 6:
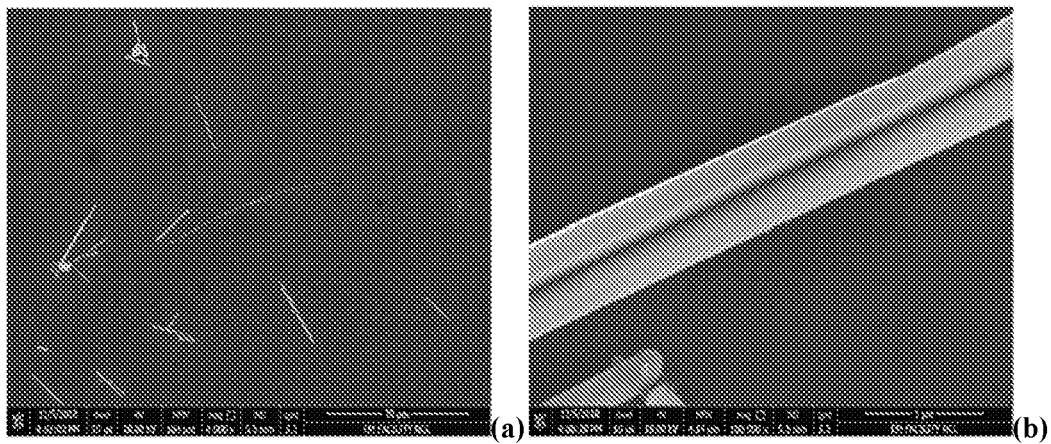
FIG. 6 represent FESEM images of Silver Nanowires produced in single bubble column with converging-diverging sections.

Example No. 5: Using the reactor in FIG. 1D where the sections are achieved by reducing the cross-section of the reactor periodically, upon carrying out the reactions at conditions mentioned in Example 1, a lot of wall deposition as well as cluster formations on sparger were observed which led to the decrease in the overall conversion (61.5%). Also, the aspect ratio of the wires was very low (120-160) (average length 10±5 µm and diameter 200±55 nm), refer FIG. 6.

Experimental Examples of the Invention Ex 6-13, Except 10

Figure 7:
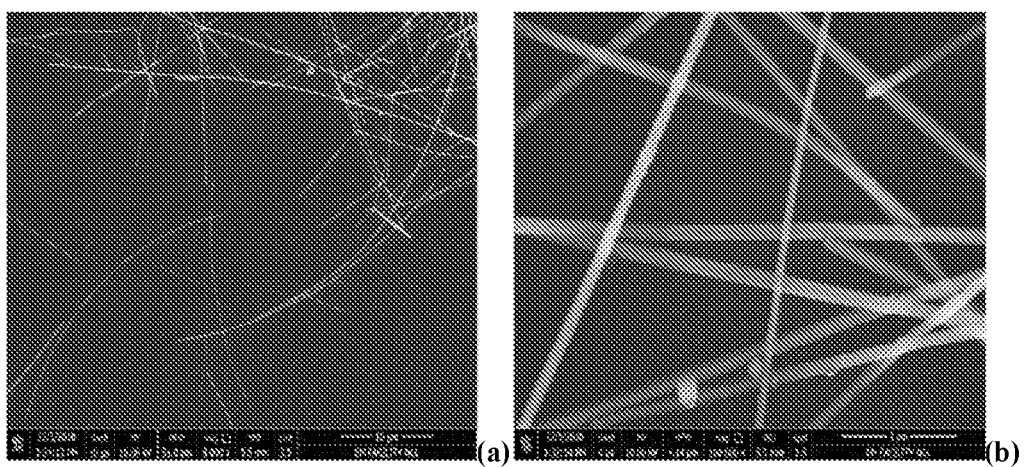
FIG. 7 represent FESEM images of Silver Nanowires produced in a single bubble column with modified sparger and air compressor was used for gas sparging.

Example No. 6: Experiments were carried out in the setup (using only the reactor in FIG. 1C and without using any CSTR) and conditions of Example 3 such that the air sparging was done at an outlet pressure ~1 bar. Analysis of samples showed a total overall conversion of 91.1%. The aspect ratio went beyond 1000 for an average diameter and length of 60±10 nm and 35±15 µm respectively, refer FIG. 7.

Figure 8:
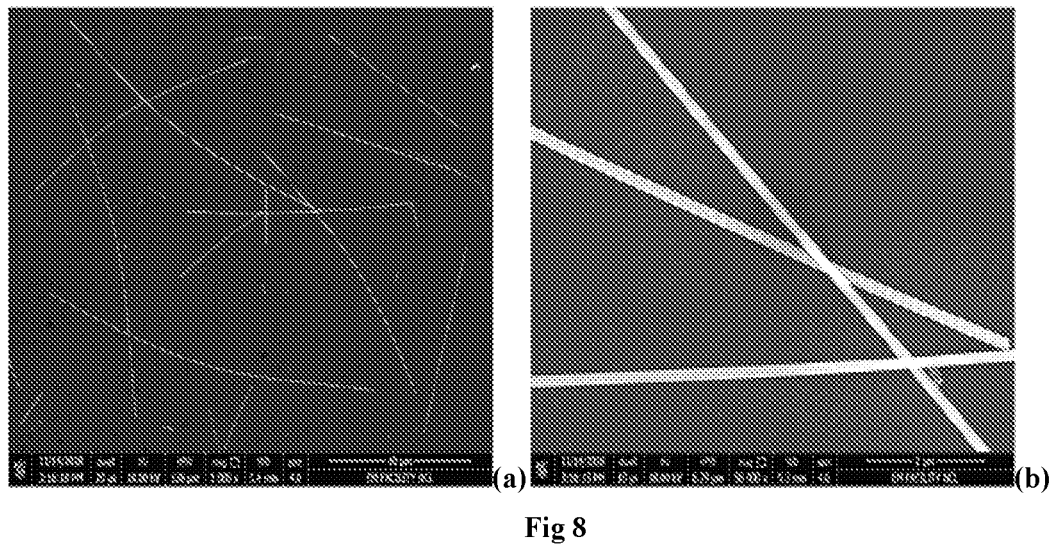
FIG. 8 represent FESEM images of Silver Nanowires produced using two bubble columns in series set up.

Example No. 7: Upon using only two bubble columns in series with same Hc/D ratio and sparger design (FIG. 1B and FIG. 1B), an overall residence time of 1 hour, the optimized reaction stoichiometry, and when the reactants were fed to the first bubble column at identical conditions as in Example 6, conversion increased to 91.7% and the nanowires produced in this example were longer by 50% when compared to the results in a single bubble column. The Average length and diameter of the Silver nanowires was 65±10 nm and 35±25 μm respectively, refer FIG. 8.

The second bubble column allow unidirectional growth of nanowires.

Figure 9:
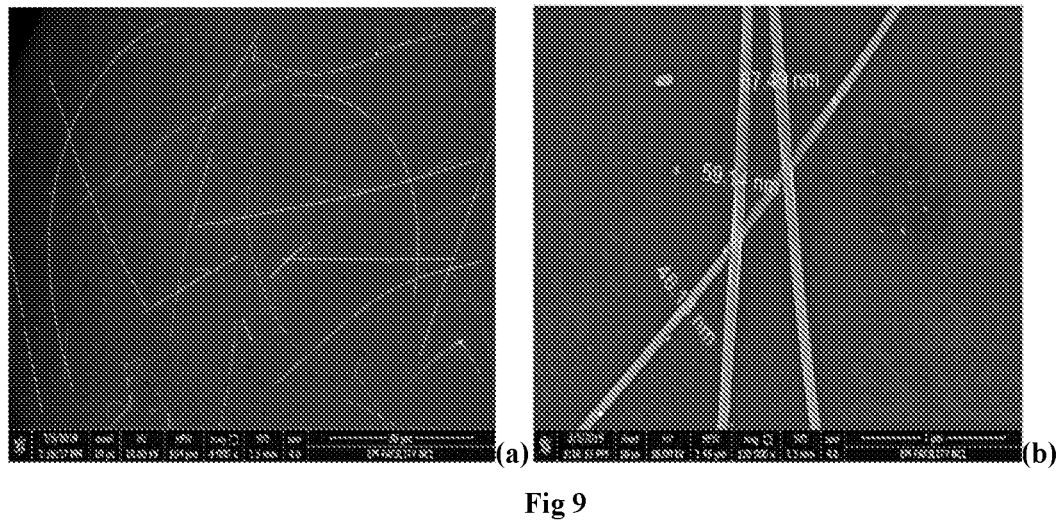
FIG. 9 represent FESEM images of Silver Nanowires produced using two bubble columns in series set up.

Example No. 8: Using only two bubble columns (FIG. 1B and FIG. 1B), with incorporation of jets for cleaning of surfaces and at a residence time of 15 min in each reactor and at 165° C. with the reaction stoichiometry as in Example 7, and with PVP having a combination of different molecular weights (mol. wt. 55,000:360,000) resulted in 96% conversion of silver nitrate and nanowires of 50 nm diameter and aspect ratio between 500 to 1000, refer FIG. 9.

Figure 1E:
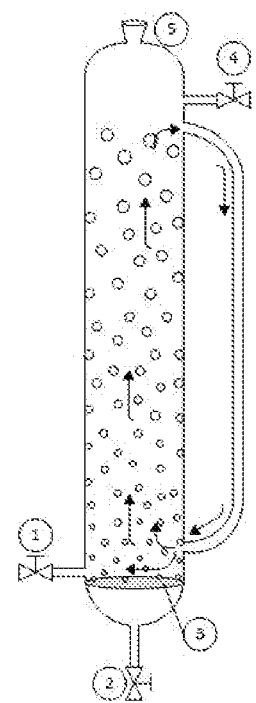
FIG. 1E represent External loop air lift reactor-reactor inlet where the reactants are introduced into the column, 2—the inlet provided for gas/air, 3—sparger, 4—outlet for reactant mixture and 5—outlet for air)
Figure 1F:
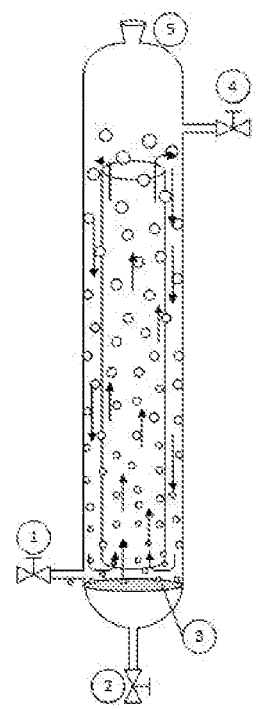
FIG. 1F represent Internal loop air lift reactor, wherein 1—reactor inlet where the reactants are introduced into the column, 2—the inlet provided for gas/air, 3—sparger, 4—outlet for reactant mixture and 5—outlet for air.
Figure 10:
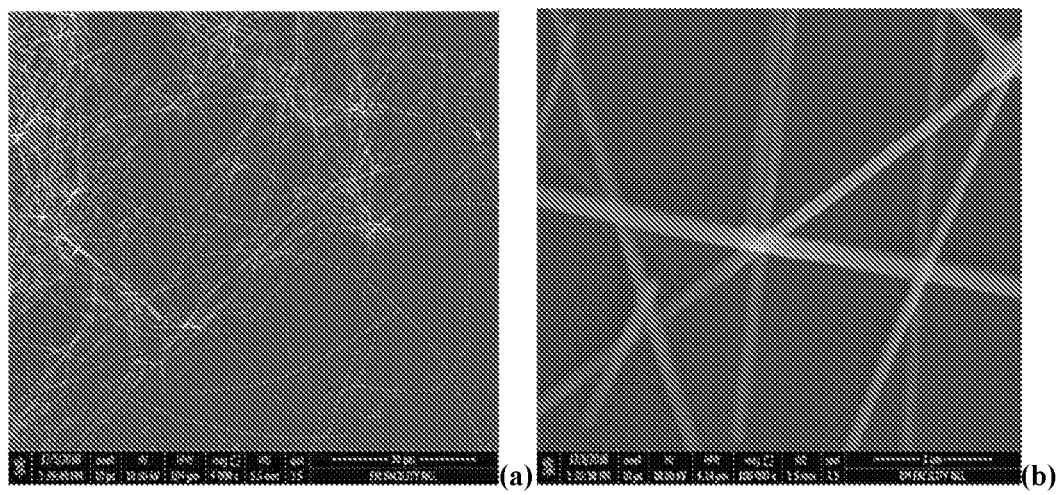
FIG. 10 represent FESEM images of Silver Nanowires produced using two bubble columns in series set up (simple bubble column followed by air lift bubble column).

Example No. 9: In the experimental set-up in Example 8, an internal air lift loop reactor was used after the first bubble column reactor (FIG. 1B and FIG. 1F). The temperature of the first reactor was maintained at 130° C. while the temperature of the second reactor was maintained at 160° C. It resulted in 97% conversion and wires having diameter of 55±10 nm and an aspect ratio was 600-1000, refer FIG. 10.

Example No. 10: Upon repeating the experiment in Example no. 3 (using the reactor in FIG. 1C), with sparging of air at a superficial velocity of 0.04 m/s, resulted in shorter nanowires and product was dominant with large number of silver nanoparticles. The conversion of silver ions into silver nanowires was up to 63.9%, while the aspect ratio was also significantly reduced in the range of 100-180 for an average diameter and length of 160±65 nm and 18±13 μm respectively.

Example No. 11: Upon repeating Example 9 by replacing the internal loop air lift reactor with an external loop air lift reactor, after a bubble column reactor (FIG. 1B and FIG. 1E), it resulted in 96% conversion and wires having diameter of 75±8 nm and an aspect ratio was 400-600.

Example No. 12: A sequence of two external air loop reactors (FIG. 1E and FIG. 1E) at 130° C. and 160° C. with the other parameters same as in Example 8, it resulted in 93% conversion and wires having diameter of 65±10 nm and an aspect ratio was 300-650.

Example No. 13: A sequence of two internal air loop reactors (FIG. 1F and FIG. 1F) at 130° C. and 160° C. with the other parameters same as in Example 8, it resulted in 96% conversion and wires having diameter of 60±10 nm and an aspect ratio was 500-650.

ADVANTAGES OF THE INVENTION

Continuous process of synthesis
High yield providing process
Easy to operate, since there are no moving parts
Aspect ratio is tunable

We claim:
1. A continuous flow process for the synthesis of metal nanowires, wherein the said process employs at least one unstirred bubble column reactor, and wherein the said process comprises the steps of:
   a) dissolving a metal salt in ethylene glycol to obtain a solution A;
   b) preheating ethylene glycol and dissolving poly (vinyl pyrrolidone) (PVP 40,000-360,000) to obtain a solution B;
   c) continuously feeding a blend of the solution A, solution B and a solution of $FeCl_3$ in ethylene glycol to the at least one unstirred bubble column reactor from a bottom inlet;
   d) maintaining the temperature in each reactor at 130-190° C., with a cumulative residence time of 25-80 min; and
   e) allowing the growth of nanowires of the metal to the desired dimensions,
   wherein the aspect ratio of said nanowire is tunable in the range of 300 to 1200 with 100% purity, and the conversion of metal salt is in the range of 85% to 95%.

2. The process as claimed in claim 1, wherein the process employs at least two unstirred bubble column reactors.

3. The process as claimed in claim 1, wherein a plurality of unstirred bubble column reactors are connected in series.

4. The process as claimed in claim 1, wherein 2-10 unstirred bubble column reactors are connected in series.

5. The process as claimed in claim 1, wherein the metal salt of step (a) is silver nitrate.

6. The process as claimed in claim 1, wherein solution A is 0.25 to 0.65 M solution of silver nitrate in ethylene glycol.

7. The process as claimed in claim 1, wherein solution B is 0.077 M solution of poly vinyl pyrrolidone in ethylene glycol.

8. The process as claimed in claim 1, wherein the continuous flow process for the synthesis of metal nanowires comprises the steps of:
   a) dissolving a metal salt into ethylene glycol to obtain 0.25 to 0.65 M solution of metal salt;
   b) preheating ethylene glycol to 110° C. and dissolving poly (vinyl pyrrolidone) (PVP; 40,000-360,000) to obtain a 0.077 M solution of PVP;
   c) continuously feeding a blend of the 0.25 to 0.65 M metal salt, the 0.077 M PVP, and 800 μM $FeCl_3$ in ethylene glycol solution to the at least one unstirred bubble column reactor;
   d) maintaining the temperature in each reactor at 130-190° C., with a cumulative residence time of 25-80 min; and
   e) allowing the growth of nanowires of the metal to the desired dimensions.

9. The process as claimed in claim 1, wherein the at least one unstirred bubble column reactor comprises: a column alone or in series with at least one more column optionally comprising at least one external or one internal air loop or said column comprising one or at least two sections, the diameter of each section being same, the sections connected by a narrower section, wherein the ratio of diameter of narrow section:diameter of section is in the range 0.2 to 0.5 and the ratio of the length of section:diameter of section is always 1 to 2; a sintered plate sparger or a ring sparger wherein the diameter of the sparger is equal to or greater than the diameter of the narrow section, with a superficial air velocity of 0.01-0.06 m/s and at least two air jets of 1 mm diameter and a velocity >1 meter/second.

10. The process as claimed in claim 1, wherein the at least one unstirred bubble column reactor further comprises one or more multiphase unstirred reactors wherein said reactor further comprises a simple unstirred bubble column reactor or an unstirred, sectionalized bubble column reactor with perforated plates or an unstirred sectionalized bubble column with plurality of compartments having no perforated plates or an internal air-lift loop reactor or external air-lift loop reactor with draft tube having diameter of 0.1-0.4 times the column diameter and the ratio of the reactor height to diameter in the range 6-20 and a sparger (ring sparger or sintered sparger) with at least one air jet periodically operated at 0.5 mm to 2 mm diameter with a jet air velocity >1 meter/second, wherein the diameter of the sparger is equal to the diameter of the column.

\* \* \* \* \*